(12) United States Patent
Celik-Butler et al.

(10) Patent No.: US 8,994,528 B2
(45) Date of Patent: *Mar. 31, 2015

(54) THIN FLEXIBLE SENSOR

(75) Inventors: Zeynep Celik-Butler, Colleyville, TX (US); Donald P. Butler, Colleyville, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1117 days.

This patent is subject to a terminal disclaimer.

(21) Appl. No.: 12/664,838

(22) PCT Filed: Jun. 13, 2008

(86) PCT No.: PCT/US2008/066842
§ 371 (c)(1),
(2), (4) Date: May 10, 2010

(87) PCT Pub. No.: WO2008/157298
PCT Pub. Date: Dec. 24, 2008

(65) Prior Publication Data
US 2010/0245114 A1  Sep. 30, 2010

Related U.S. Application Data

(60) Provisional application No. 60/944,479, filed on Jun. 15, 2007.

(51) Int. Cl.
G08B 1/08 (2006.01)
G08B 13/14 (2006.01)
(Continued)

(52) U.S. Cl.
CPC ............... *G01D 11/245* (2013.01); *G01L 1/18* (2013.01); *G01L 1/205* (2013.01)
USPC ............. 340/539.22; 340/539.26; 340/573.1; 340/572.1

(58) Field of Classification Search
USPC .................. 340/239.22, 539.26, 573.1, 572.1
See application file for complete search history.

(56) References Cited

U.S. PATENT DOCUMENTS 4,263,659 A    4/1981  Hirata et al.
5,257,547 A *  11/1993 Boyer ............................. 73/756
(Continued)

FOREIGN PATENT DOCUMENTS

EP    1057451 A2   12/2000
EP    1491176 A1   12/2004
(Continued)

OTHER PUBLICATIONS

Shamanna et al. disclosed Micromachined Integrated Pressure-Thermal Sensors on Flexible Substrates.*
(Continued)

*Primary Examiner* — Jennifer Mehmood
*Assistant Examiner* — Emily C Terrell
(74) *Attorney, Agent, or Firm* — Daniel J. Chalker; Chalker Flores, LLP

(57) ABSTRACT

The present invention provides a sensor (100, 300, 400) that includes a thin and substantially flat flexible substrate (102, 406) having one or more sensor arrays (104, 302), a power source (106, 416), an output interface (108, 418) and a processor or analog circuit (304), all of which are disposed on the substantially flat flexible substrate (102, 406). The substrate (102, 406) can be any shape (e.g., rectangular, circular, a polygon, an irregular shape that is decorative) and made from a polymer, metal film or other suitable material. Note that the substrate can be rigid or semi-flexible instead of flexible. A protective layer may cover the sensor array (104, 302), the power source (106, 416), and the processor or analog circuit (304). Alternatively, a protective covering can be used to encapsulate the device. The one or more sensor arrays (104, 302) measure acceleration, force or pressure.

42 Claims, 5 Drawing Sheets

(51) Int. Cl.
*G08B 23/00* (2006.01)
*G01D 11/24* (2006.01)
*G01L 1/18* (2006.01)
*G01L 1/20* (2006.01)

(56) References Cited

U.S. PATENT DOCUMENTS

| | | | |
|---|---|---|---|
| 5,476,092 A | 12/1995 | Karlis et al. | |
| 5,665,249 A * | 9/1997 | Burke et al. | 216/2 |
| 6,071,819 A * | 6/2000 | Tai et al. | 438/694 |
| 6,239,724 B1 * | 5/2001 | Doron et al. | 340/870.28 |
| 6,268,635 B1 * | 7/2001 | Wood | 257/415 |
| 6,306,107 B1 | 10/2001 | Myklebust et al. | |
| 6,308,723 B1 * | 10/2001 | Louis et al. | 137/1 |
| 6,351,671 B1 | 2/2002 | Myklebust et al. | |
| 6,390,996 B1 | 5/2002 | Halperin et al. | |
| 6,858,016 B2 | 2/2005 | Davaris et al. | |
| 6,939,299 B1 * | 9/2005 | Petersen et al. | 600/398 |
| 7,074,199 B2 | 7/2006 | Halperin et al. | |
| 7,108,665 B2 | 9/2006 | Halperin et al. | |
| 7,118,542 B2 | 10/2006 | Palazzolo et al. | |
| 7,122,014 B2 | 10/2006 | Palazzolo et al. | |
| 7,220,235 B2 | 5/2007 | Geheb et al. | |
| 7,295,871 B2 | 11/2007 | Halperin et al. | |
| 7,409,876 B2 * | 8/2008 | Ganapathi et al. | 73/862.046 |
| 7,518,493 B2 * | 4/2009 | Bryzek et al. | 340/442 |
| 7,670,861 B2 * | 3/2010 | Hanaoka et al. | 438/53 |
| 8,007,436 B2 * | 8/2011 | Katayama | 600/301 |
| 8,034,006 B2 * | 10/2011 | Celik-Butler et al. | 601/41 |
| 2002/0055694 A1 | 5/2002 | Halperin et al. | |
| 2002/0078954 A1 | 6/2002 | Davaris et al. | |
| 2002/0180605 A1 * | 12/2002 | Ozguz et al. | 340/573.1 |
| 2002/0193711 A1 | 12/2002 | Halperin et al. | |
| 2003/0012231 A1 * | 1/2003 | Tayebati et al. | 372/20 |
| 2003/0089394 A1 * | 5/2003 | Chang-Chien et al. | 137/14 |
| 2003/0093248 A1 * | 5/2003 | Vock et al. | 702/188 |
| 2004/0016995 A1 * | 1/2004 | Kuo et al. | 257/678 |
| 2004/0082888 A1 | 4/2004 | Palazzolo et al. | |
| 2004/0210170 A1 | 10/2004 | Palazzolo et al. | |
| 2004/0210171 A1 | 10/2004 | Palazzolo et al. | |
| 2005/0160814 A1 * | 7/2005 | Vaganov et al. | 73/514.01 |
| 2005/0197672 A1 | 9/2005 | Freeman et al. | |
| 2005/0266599 A1 * | 12/2005 | Ikegami | 438/52 |
| 2006/0009809 A1 | 1/2006 | Marcovecchio et al. | |
| 2006/0113537 A1 * | 6/2006 | Krulevitch et al. | 257/57 |
| 2006/0235320 A1 | 10/2006 | Tan et al. | |
| 2006/0247560 A1 | 11/2006 | Halperin et al. | |
| 2007/0010764 A1 | 1/2007 | Palazzolo et al. | |
| 2007/0018083 A1 | 1/2007 | Kumar et al. | |
| 2007/0100379 A1 | 5/2007 | Tan et al. | |
| 2007/0123756 A1 | 5/2007 | Kitajima et al. | |
| 2007/0135739 A1 | 6/2007 | Halperin et al. | |
| 2007/0162076 A1 | 7/2007 | Tan et al. | |
| 2008/0171311 A1 | 7/2008 | Centen et al. | |
| 2009/0152655 A1 * | 6/2009 | Laming et al. | 257/416 |
| 2010/0288157 A1 * | 11/2010 | LeFebvre et al. | 105/218.1 |

FOREIGN PATENT DOCUMENTS

| | | |
|---|---|---|
| WO | 9731608 | 9/1997 |
| WO | 2006088373 A1 | 8/2006 |
| WO | 2006104977 A2 | 10/2006 |

OTHER PUBLICATIONS

Mahmood et al. disclosed Flexible Microbolometers Promise Smart Fabrics with Embedded Sensors.*

Mahmood et al. disclosed Micromachined Bolometers on Polyimide.*

Butler et al. disclosed Flexible Sensors-A Review.*

Celik-Butler, Z., et al., "Flexible Sensors: a Review," J. Nanoelectronics and Optoelectronics, (2006), 1:194-202.

Dayeh, S. A., et al., "Micromachined Infrared Bolometers on Flexible Polyimide Substrates," Sensors and Actuators (2005), AI18:49-56.

Mahmood, A., et al., "Flexible Microbolometers Promise Smart Fabrics with Imbedded Sensors," Laser Focus World, (2004) pp. 99-103.

Mahmood, A., et al., "Micromachined Bolometers on Polyimide," Sensors and Actuators A, (2006), 132:452-459.

Shamanna, V., et al., "Integrated Pressure-Thermal Sensors on Flexible Substrates," Journal of Micromechanics and Microengineering (2006), 16:1984-1992.

Yaradanakul, A., et al., "Uncooled Infrared Microbolometers on a Flexible Substrate," IEEE Transactions on Electron Devices, (2002), 49:930-933.

Yildiz, A., et al., "Microbolometers on a Flexible Substrate for Infrared Detection," IEEE Sensors Journal, (2004), 4:112-117.

Celik-Butler, Z, "Nano-Bio Interface," BIOFW Regional Alliance, Southwestern Medical Center, Dallas, TX (Apr. 20, 2006).

Celik-Butler, Z., et al., Self Packaged Flexible Electronics, IEEE-EDIS Distinguished Lecture, Tempe AZ (Jan. 13, 2006).

Celik-Butler, Z., "Self-Packaged Flexible Electronics," NanoTX, Dallas Convention Center, Dallas TX (Sep. 28, 2006).

Celik-Butler, Z., et al., "Smart Skin," Mid-Cities Technical Club Meeting, Arlington, TX (Mar. 3, 2004).

Celik-Butler, Z., et al., "Smart Skin: Multifunctional Sensory Arrays on Flexible Substrates," Strategic Partnership for Research in Nanotechnology (SPRING) Workshop 11, University of Texas at Dallas, (Nov. 12, 2004).

Extended European Search Report for EP 08 45 0087 dated Aug. 28, 2008.

International Search Report and Written Opinion for PCT/US2008/066842 dated Feb. 20, 2009.

* cited by examiner

DV-UW-P

DV-UNW-P

DV-UL-P

DV-YW-P

DV-YNW-P

DV-YL-P

THIN FLEXIBLE SENSOR

FIELD OF INVENTION

The present invention relates generally to the field of sensors and, more particularly, to a thin flexible sensor

BACKGROUND ART

There are many types of semiconductor-based rigid sensors. Implementation of semiconductor-based sensors that measure acceleration, force or pressure on a substrate and a size such that the sensors are flexible or semi-flexible has been problematic and commercially unsuccessful for the most part. These problems include thermal budget restrictions of the underlying substrates, mechanical integrity of the sensors on the flexible substrate, surface roughness of the substrates, signal routing, adhesion of metals to polyimide substrates, cross-talk between sensors, power supply requirements, high cost and unacceptable manufacturing requirements. Moreover, current flexible sensors do not provide real-time feedback that can be used to adjust a stimulus, such as touch, force, acceleration and flow, or the operational characteristics of device to compensate for the stimulus.

Accordingly, there is a need for a flexible, non-intrusive, real-time, low cost, readily available feedback device to measure and assess acceleration, force or pressure.

SUMMARY OF THE INVENTION

The present invention provides a flexible or semi-flexible sensor that is compact and thin so as to be readily available and easily portable, self-contained and wireless, self-powered, semi-flexible, simple and easy to use within minimal instruction and provides real-time feedback to the user or monitoring system. Moreover, the flexible or semi-flexible sensor of the present invention sufficiently overcomes the problems encountered in previous designs.

For example, a first embodiment of a sensor in accordance with the present invention includes a thin and substantially flat flexible substrate (e.g., polymer, metal film, etc.) having one or more sensor arrays, a power source, an output interface and a processor or analog circuit, all of which are disposed on the substantially flat flexible substrate. The substrate can be any shape (e.g., rectangular, circular, a polygon, an irregular shape that is decorative) and made from a polymer, metal film or other suitable material. Note that the substrate can be rigid or semi-flexible instead of flexible. A protective layer may cover the sensor array and power source. Alternatively, a protective covering can be used to encapsulate the device. The one or more sensor arrays measure acceleration, force or pressure.

Similarly, as second embodiment of a sensor in accordance with the present invention includes a thin and substantially flat flexible substrate (e.g., polymer, metal film, etc.) having one or more sensor arrays, a processor or analog circuit, a power source, a communications interface, a geographic locator (e.g., GPS receiver, wireless communications device or other wireless location device), an output interface and a data storage, all of which are disposed on the substantially flat flexible substrate. A protective layer covers the sensor array, processor or analog circuit, power source, communications interface, geographic locator, output interface and data storage. Alternatively, a protective covering can be used to encapsulate the device. The one or more sensor arrays measure acceleration, force or pressure, and one or more operational parameters (e.g., physical contact with a recipient, physical contact with a provider, temperature of the recipient, heartbeat of the recipient, pulse of the recipient, cardiac electrical activity of the recipient, etc.). The processor or analog circuit is connected to the sensor array, power source, communications interface, geographic locator, output interface and data storage.

A third embodiment of a sensor in accordance with the present invention includes an upper protective layer, a lower protective layer and a thin and substantially flat flexible substrate (e.g., polymer, metal film, etc.) disposed between the upper protective layer and the lower protective layer. In addition, one or more sensor arrays, a processor or an analog circuit, a power source and an output interface are disposed on the flexible substrate. The one or more sensor arrays measure acceleration, force or pressure. The processor or analog circuit is connected to the sensor array, output interface and power source.

In addition, the present invention provides a method for manufacturing a sensor by performing the following steps: passivating a silicon wafer; adding a polyimide layer to the wafer; creating one or more sensor arrays using a MEMS process wherein the sensor array(s) measure acceleration, force or pressure; dicing the wafer to extract the individual dies/sensors; printing a circuit on a flexible substrate; applying a paste or epoxy to the flexible substrate to receive and secure the individual dies/sensors; placing the individual dies/sensors on the flexible substrate; placing the flexible substrate on a lower protective layer containing electrical interconnects and an output interface, a processor or an analog circuit, and a power source; securing the flexible substrate to the lower protective layer; placing and securing a upper protective layer to the flexible substrate and the lower protective layer to complete assembly of the sensor.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to sensors, but it will be understood that the concepts of the present invention are applicable to any thin form acceleration, force or pressure sensors.

The sensor is a low cost, very compact assembly of individual force and/or pressure, acceleration sensors, powering source (battery or energy harvesting with conditioning and storage electronics), biasing circuitry, read-out circuitry and necessary electrical connections. Individual sensors are fabricated on traditional non-flexible substrates (silicon). These individual sensors are then placed on a flexible printed circuit or a rigid card. The sensor can be incorporated into portable equipment or can be used stand-alone. Because of its revolutionary small size and low cost, it can be manufactured as part of a wallet, a pocket or part of any clothing. Flexible, disposable versions can be incorporated into public phones, cell phones or land-line home phones as removable strips when needed. The present invention provides a flexible or semi-flexible sensor that is compact and thin so as to be readily available and easily portable, self-contained and wireless, self-powered, semi-flexible, simple and easy to use within minimal instruction and provides real-time feedback to the user or monitoring system. Moreover, the flexible or semi-flexible sensor of the present invention sufficiently overcomes the problems encountered in previous designs.

Figure 1:
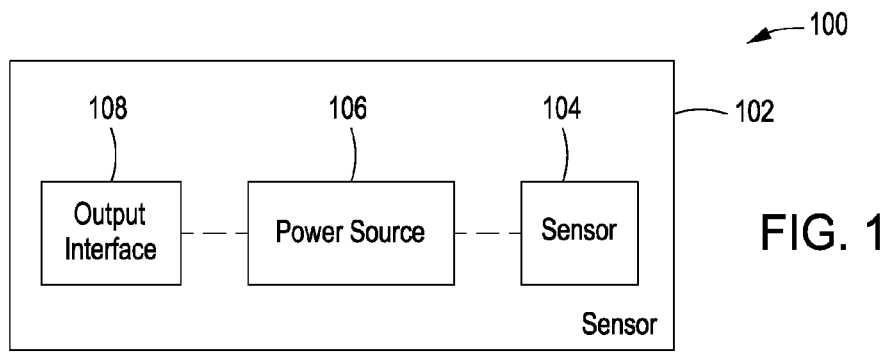
FIG. 1 is a block diagram of a sensor in accordance with first embodiment of the present invention.

Now referring to FIG. 1, a block diagram of a sensor 100 in accordance with first embodiment of the present invention is shown. The sensor 100 includes a thin and substantially flat flexible substrate 102 having one or more sensor arrays 104, a power source 106 and an output interface 108, all of which are disposed on the substantially flat flexible substrate 102. The substrate 102 can be any shape (e.g., rectangular, circular, a polygon, an irregular shape that is decorative) and made from a polymer, metal film or other suitable material. Note that the substrate 102 can be rigid or semi-flexible instead of flexible. If the substrate 102 is flexible or semi-flexible, it should be able to be stretched, wrinkled or flexed without degradation of the sensors 104. The one or more sensor arrays 104 measure acceleration, force or pressure. The sensor array 104 and output interface 108 are connected to the power source 106.

A processor or analog circuit or logic circuit within or external to the sensor arrays 104 and/or output interface 108 determines whether one or more operational parameters are within one or more guidelines in order to provide feedback to the provider indicating whether the operational parameters are within the guidelines via the output interface 108. The one or more operational parameters may include an applied pressure, an acceleration, a shearing force, a compressive force (e.g., depth, force, frequency or acceleration) or a combination thereof. The one or more sensors 104 may also detect a physical contact with an object or a recipient, a temperature of the object or the recipient, an electrical activity of the object or the recipient. The recipient can be a human, an animal or a manikin. The object can be a machine, a structure, a composition, a vehicle (land, water, air, space, subsurface), a plant or a natural object. The output interface 108 can be a visual display (e.g., light emitting diodes, liquid crystal displays or other visual display known to those skilled in the art), a speaker, a multi-tone generator, a communications interface or a combination thereof. The visual display can be a set of light emitting diodes that provide a feedback to the user, a status of the sensor, a status of the recipient or a combination thereof.

The power source 106 can be a battery, a solar panel, a layer of piezoelectric film or any type of energy harvesting technology for voltage generation or a combination thereof. Note that the battery can be disposed on the flexible substrate 102 such that it is replaceable or rechargeable. The power source 106 can also be a combination of a battery along with one of the voltage generators connected to a power controller to manage power consumption and storage in the battery and the layer of piezoelectric film or other energy harvesting methods for voltage generation.

A protective layer (not shown) may cover the sensor array 104 and power source 106. A window or clear protective layer can be used to protect the output interface 108, yet still allow the output interface 108 to provide data, signals, indications and visual and/or audio signals. Alternatively, a protective covering can be used to encapsulate the device 100.

The sensor 100 can be integrated in or attached to a manikin, a recipient, an object, a device, a personal item (e.g., business card, a credit card, a debit card, a membership card, a driver's license, an identification card, a wallet, etc.) a clothing or other thin portable user device. The device can be a cellular phone, a mobile communications device, a personal data assistant, an audio and/or video playback device or other device likely to be carried by a person. The sensor 100 can also be disposable in cases where the sensors cannot be reused (e.g., medical applications). The sensor 100 may also include an adhesive layer dispose on a back exterior surface of the sensor 100 and a sheet of removable protective material covering the adhesive layer so that the sensor 100 will temporarily remain in place on the recipient or object.

Figure 2:
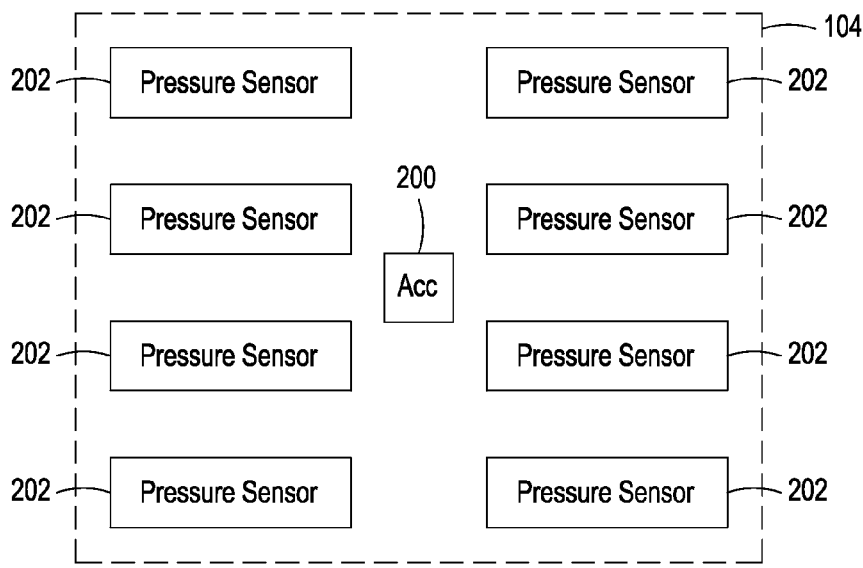
FIG. 2 is a block diagram of a sensor array to measure one or more compression characteristics in accordance with one embodiment of the present invention.

Referring now to FIG. 2, a block diagram of a sensor array 104 to measure acceleration, force or pressure in accordance with one embodiment of the present invention is shown. The sensor array 104 can include one or more accelerometers 200 and one or more pressure sensors 202 positioned around the accelerometer 200. Other arrangement and numbers of individual sensors can be used.

Figure 3:
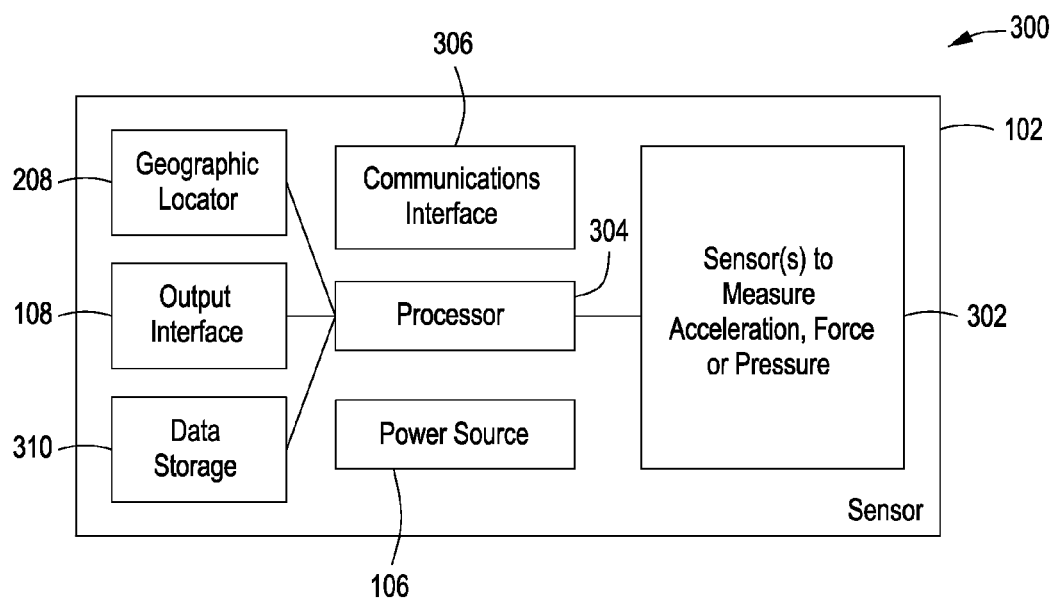
FIG. 3 is a block diagram of a sensor in accordance with a second embodiment of the present invention.

Now referring to FIG. 3, a block diagram of a sensor 300 in accordance with a second embodiment of the present invention is shown. The sensor 300 includes a thin and substantially flat flexible substrate 102 having one or more sensor arrays 302, a processor or analog circuit 304, a power source 106, a communications interface 306, a geographic locator 308, an output interface 108 and a data storage 310, all of which are disposed on the substantially flat flexible substrate 102. The substrate 102 can be any shape (e.g., rectangular, circular, a polygon, an irregular shape that is decorative) and made from a polymer, metal film or other suitable material. Note that the substrate 102 can be rigid or semi-flexible instead of flexible. If the substrate 102 is flexible or semi-flexible, it should be able to be stretched, wrinkled or flexed without degradation of the sensors 302. The geographic locator can be a GPS receiver, wireless communications device or other wireless location device. A protective layer (not shown) covers the sensor array 302, processor or analog circuit 304, power source 106, communications interface 306, geographic locator 308, output interface 108 and data storage 310. A window or clear protective layer can be used to protect the output interface 108 and communications interface 306 (if necessary), yet still allow the output interface 108 and/or communications interface 306 to operate properly and as intended. Alternatively, a protective covering can be used to encapsulate the device 300. The one or more sensor arrays 302 measure acceleration, force or pressure, and one or more operational parameters (e.g., a physical contact with an object or a recipient, a temperature of the object or the recipient, an electrical activity of the object or the recipient, etc.). The processor or analog circuit 304 is connected to the sensor array 302, power source 106, communications interface 306, geographic locator 308, output interface 108 and data storage 310. The sensor array 302, communications interface 306, geographic locator 308, output interface 108 and data storage 310 may also be connected to the power source 106.

The processor or analog circuit 304 determines whether one or more operational parameters are within one or more guidelines in order to provide feedback to the provider indicating whether the operational parameters are within the guidelines via the output interface 108. The one or more operational parameters may include an applied pressure, an acceleration, a shearing force, a compressive force (e.g., depth, force, frequency or acceleration) or a combination thereof. The recipient can be a human, an animal or a manikin. The object can be a machine, a structure, a composition, a vehicle (land, water, air, space, subsurface), a plant or a natural object. The output interface 108 can be a visual display (e.g., light emitting diodes, liquid crystal displays or other visual display known to those skilled in the art), a speaker, a multi-tone generator, a communications interface or a combination thereof. The visual display can be a set of light emitting diodes that provide a feedback to the provider, a status of the sensor, a status of the recipient or a combination thereof. The visual display can also be a LCD/CRT-like display that provides interactive wireless communication between the provider and other support personnel.

The communications interface 306 can be an optical communications interface, an infrared communications interface, a wireless communications transceiver, a physical communications port or a combination thereof. The wireless transceiver can be a cellular phone, Internet communication, personal data assistant (PDA), an active radio frequency identification tag, a passive radio frequency identification tag, etc. The geographic locator 308 (e.g., GPS receiver, wireless communications device, etc.) can be used to determine a location of the sensor 300. The processor or analog circuit 304 can periodically transmits a status of the sensor 300, location of the sensor 300, diagnostic information, a status of the recipient or the object, or a combination thereof to a monitoring station or facility via the communications interface 306. The processor or analog circuit 304 can receive instructions from the monitoring station of facility via the communications interface 306. The data storage 310 can be used to store the one or more parameters, the feedback, a status of the sensor, diagnostic information or a combination thereof. The data storage 310 can be a RFID tag, a magnetic strip, a memory or a combination thereof.

The power source 106 can be a battery, a solar panel, a layer of piezoelectric film for voltage generation during compressions, an electromagnetic voltage generator or a combination thereof. Note that the battery can be disposed on the flexible substrate 102 such that it is replaceable or rechargeable. The power source 106 can also be a combination of a battery along with one of the voltage generators connected to a power controller to manage power consumption and storage in the battery and the layer of piezoelectric film or other energy harvesting methods for voltage generation.

The sensor 300 can be integrated in or attached to a manikin, a recipient, an object, a device, a personal item (e.g., business card, a credit card, a debit card, a membership card, a driver's license, an identification card, a wallet, etc.) a clothing or other thin portable user device. The device can be a cellular phone, a mobile communications device, a personal data assistant, an audio and/or video playback device or other device likely to be carried by a person. The sensor 300 can also be disposable in cases where the sensors cannot be reused (e.g., medical applications). The sensor 300 may also include an adhesive layer dispose on a back exterior surface of the sensor 300 and a sheet of removable protective material covering the adhesive layer so that the sensor 300 will temporarily remain in place on the recipient or object.

Figure 4:
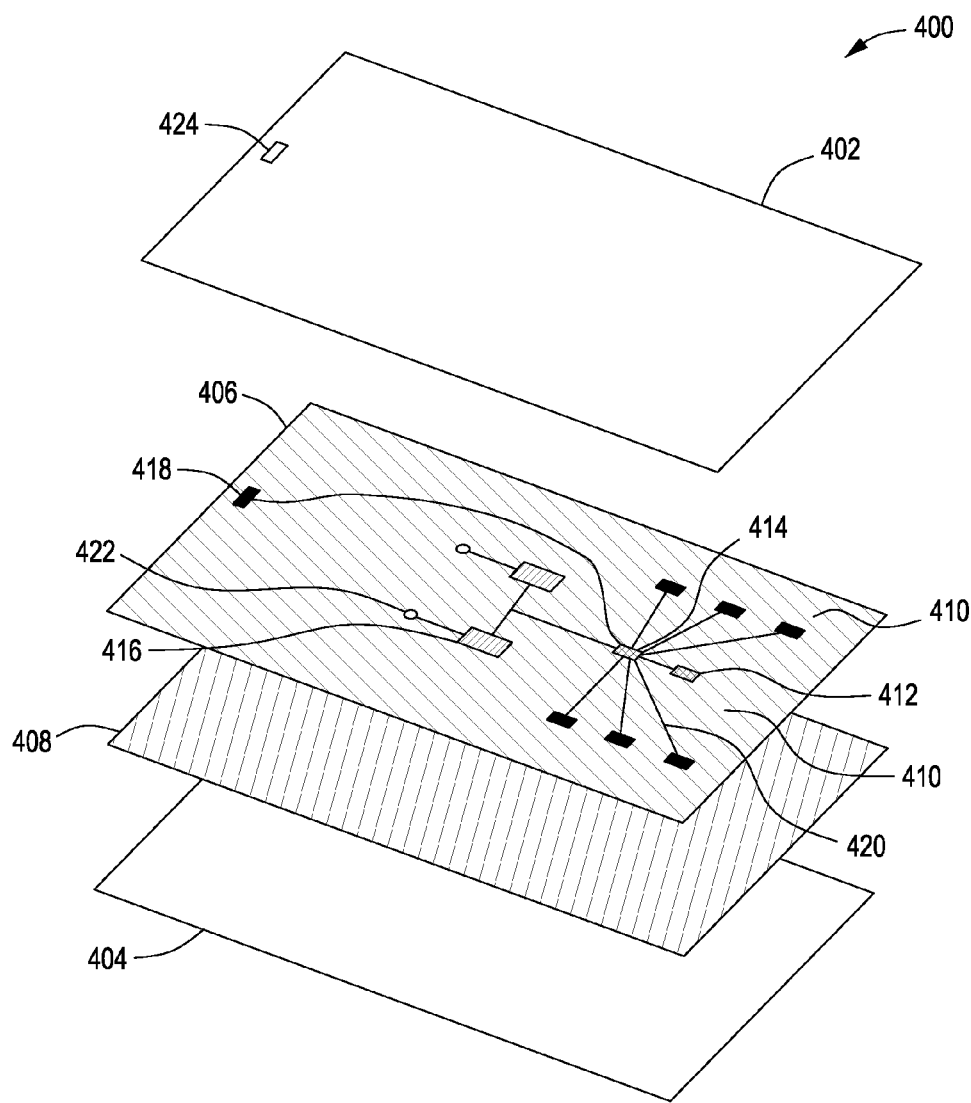
FIG. 4 is an exploded view of a sensor in accordance with a third embodiment of the present invention.

Referring now to FIG. 4, an exploded view of a sensor 400 in accordance with a third embodiment of the present invention is shown. The sensor 400 includes an upper protective layer 402, a lower protective layer 404, a thin and substantially flat flexible substrate 406 and an energy producing layer 408 (e.g., a layer of piezoelectric film or other means for energy harvesting). The substrate 406 can be any shape (e.g., rectangular, circular, a polygon, an irregular shape that is decorative) and made from a polymer, metal film or other suitable material. The thin and substantially flat flexible substrate 406 and an energy producing layer 408 are both disposed between the upper protective layer 402 and the lower protective layer 404. The upper protective layer 402 and lower protective layer 404 are semi rigid plastic films, but other materials can also be used. Upper protective layer can also be made of a transparent or semi-transparent material. If the upper protective layer 402 is not transparent, upper protective layer 402 will include an opening or window 424 oriented above the output interface 418. The energy producing layer 408 can be a piezoelectric film or other means which generates a voltage in response to applied mechanical stress. During use, layer 408 is compressed and will start generating a voltage which will be applied to collecting means 416 in layer 406. The first compressions will not lead to a sufficiently high voltage to generate a visible signal, but after a short period of time the voltage will reach a sufficient level and feedback will be provided.

In addition, one or more sensor arrays (six force sensors 410 and one compression depth sensor 412), a signal processor 414, a power source 416 (energy collector and producer means) and an output interface 418 (e.g., light emitting diodes, liquid crystal displays or other visual display known to those skilled in the art) are disposed on or attached to the flexible substrate 406. The one or more sensor arrays 410 and 412 measure acceleration, force or pressure and are typically implemented as MEMS (Micro-Electro-Mechanical Systems) sensors. The signal processor 414 is connected to the sensor array 410 and 412, output interface 418 and power source 416. The signal processor 414 compares the measured signals with threshold values and provides a feedback signal according to the results of the comparison to the output interface 418. This signal can be in the form of a series of lights corresponding to different compression depths and/or compression forces. The flexible substrate 406 also includes various leads 420 for connecting to other layers and components, and connections 422 to the energy producing layer 408. The output interface 418 displays different variables related to performance of CPR, such as compression depth, force, rate, etc.

Figure 5:
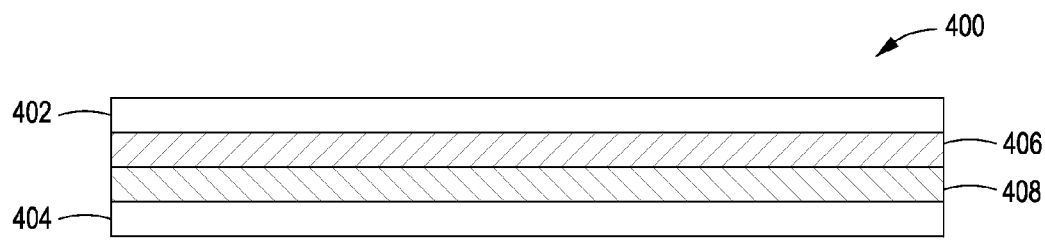
FIG. 5 is a sectional view of the sensor in accordance with the third embodiment of the present invention.

Now referring to FIG. 5, a sectional view of the sensor 400 in accordance with the third embodiment of the present invention is shown. The substantially flat body of the sensor 400 has four layers including a thin and substantially flat flexible substrate 406 and an energy producing layer 408 disposed between the upper protective layer 402 and the lower protective layer 404. The substrate 406 can be any shape (e.g., rectangular, circular, a polygon, an irregular shape that is decorative) and made from a polymer, metal film or other suitable material. The flat body 400 in this embodiment has an approximate thickness of 1.25 mm. Note that it is possible to combine the middle layers 406 and 408 to reduce the number of layers to three.

Figure 6:
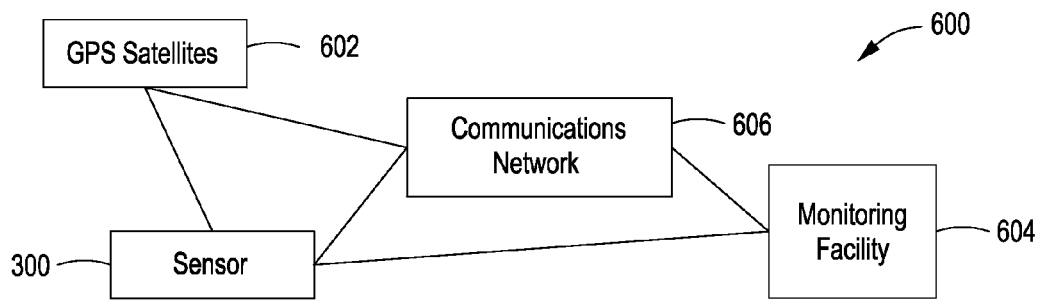
FIG. 6 is a block diagram of a system to communicate with a sensor in accordance with one embodiment of the present invention.

Now referring to FIG. 6, a block diagram of a system 600 to communicate with a sensor 300 in accordance with one embodiment of the present invention is shown. Sensor 300 receives signals from GPS satellites 602 via an internal GPS receiver (geographic locator) so that the position of the sensor 300 can be determined. This information along with other desirable information regarding the status of the sensor 300 and the recipient or object can be transmitted (continuously or periodically) to a remote monitoring facility 604 via a communications network 606 using an internal communications interface. The communications network 606 can be any type of wireless communications network or combination of wireless and landline network.

For example, the present invention can be implemented in a cardiopulmonary resuscitation sensor as described in a U.S. non-provisional patent application filed on Jun. 15, 2007 and entitled "Cardiopulmonary Resuscitation Sensor" which is hereby incorporated by reference in its entirety.

Figure 7:
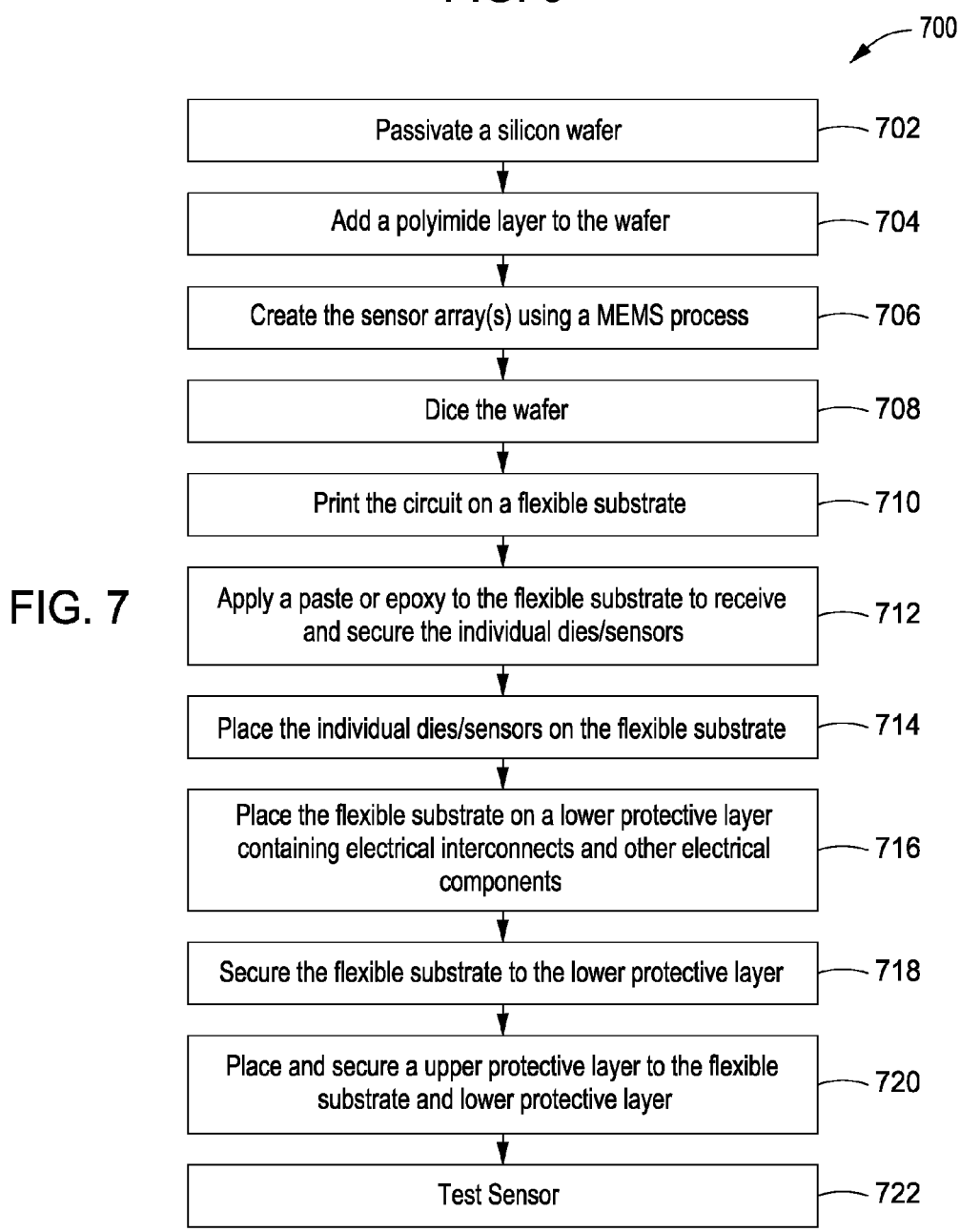
FIG. 7 is a flow chart of a manufacturing process to make a sensor in accordance with the present invention.

Referring now to FIG. 7, a flow chart of a manufacturing process 700 to make a sensor in accordance with the present invention is shown. The method 700 for manufacturing a sensor includes the following steps: passivate a silicon wafer 702; add a polyimide layer to the wafer 704; create one or more sensor arrays using a MEMS process 706 wherein the sensor array(s) measure acceleration, force or pressure; dice the wafer to extract the individual dies/sensors 708; print a circuit on a flexible substrate 710; apply a paste or epoxy to the flexible substrate to receive and secure the individual dies/sensors 712; place the individual dies/sensors on the flexible substrate 714; place the flexible substrate on a lower protective layer containing electrical interconnects and an output interface, a processor or analog circuit and a power source 716; secure the flexible substrate to the lower protective layer 718; place and secure a upper protective layer to the flexible substrate and the lower protective layer to compete assembly of the sensor 720; and test the sensor 722.

Additional details regarding various examples of the fabrication of the sensor arrays will now be described. For example, the following steps describe a process flow for a non-micromachined pressure sensor:

Step 1 Deposit (spin) approximately 40 μm of polyimide on top of a silicon or silicon-based substrate (does not need to be prime quality). This forms the base of the flexible substrate. Repeated steps of spin-casting and curing are typically required.

Step 2 Deposit approximately 2 μm of $Si_3N_4$ on top of the polyimide.

Step 3 Pattern the $Si_3N_4$ layer using a mask to form a bridge structure (see P1.1 below).

Step 4 Deposit polysilicon 2 on top of the $Si_3N_4$ layer.

Step 5 Pattern the polysilicon 2 using a mask (see P1.2 below).

Step 6 Deposit approximately 0.5 μm of A;1 on top of the polysilicon layer.

Step 7 Pattern the Al 1 using a mask (see P1.3 below).

|  | Material to be patterned | Minimum Feature Size (μm) | Polarity assuming (+) resist and etch |
|---|---|---|---|
| P1.1 | $Si_3N_4$ bridge | 20 | Transparent on black |
| P1.2 | Poly-Si 2 piezoresistor | 4 | Black on transparent |
| P1.3 | Al metallizations | 50 | Black on transparent |

The following information is application to the previous example as well as the following examples. The polysilicon is a typical zero-stress MEMS structural layer. All the $Si_3N_4$ layers should be zero-stress as deposited. In addition, the dimensions of a representative $Si_3N_4$ Bridge arm are:

| Length (μm) | Width before divergence (μm) | Maximum width at edge (μm) | Thickness (μm) |
|---|---|---|---|
| 58.62 | 21.21 | 31.38 | 2 |

Polysilicon 2 is a large grain (1 μm size on average) doped ploy layer with resistivity of 0.1 to 100 Ω-cm. The dimensions of a representative polysilicon 2 piezoresistor on the bridge are are:

| Length of resistor along one arm (μm) | Length of the resistor along edges (μm) | Total effective length (μm) | Width of resistor along U part (μm) | Width along edges (μm) | Thickness (μm) | Width along bonding (μm) | Length along bonding (μm) |
|---|---|---|---|---|---|---|---|
| 21.21 | 9 | 71.64 | 3.432 | 4.5 | 0.5 | 50 | 25 |

The dimensions of the Al pads used for bonding are typically:

| Bonding Pad Width (μm) | Bonding Pad Length (μm) | Connecting Wire Width (μm) |
|---|---|---|
| 200 | 200 | 50 |

In another example, the following steps describe a process flow for a micromachined pressure sensor:

Step 1 Deposit (spin) approximately 40 μm of polyimide on top of a silicon or silicon-based substrate (does not need to be prime quality). This forms the base of the flexible substrate. Repeated steps of spin-casting and curing are typically required.

Step 2 Deposit approximately 0.5 μm of $Si_3N_4$ on top of the polyimide.

Step 3 Deposit (spin) approximately 1 μm of polyimide to form a sacrifical layer.

Step 4 Deposit approximately 2 μm of $Si_3N_4$ on top of the polyimide.

Step 5 Pattern the $Si_3N_4$ layer using a mask to form a bridge structure (see P2.1 below).

Step 6 Deposit polysilicon 2 on top of the $Si_3N_4$ layer.

Step 7 Pattern the polysilicon 2 using a mask (see P2.2 below).

Step 8 Deposit approximately 0.5 μm of Al 1 on top of the polysilicon layer.

Step 9 Pattern the Al 1 using a mask (see P2.3 below).
Step 10 Underetch the polyimide layer (sacrificial layer).

|  | Material to be patterned | Minimum Feature Size (μm) | Polarity assuming (+) resist and etch |
|---|---|---|---|
| P2.1 | $Si_3N_4$ bridge | 20 | Transparent on black |
| P2.2 | Poly-Si 2 piezoresistor | 4 | Black on transparent |
| P2.3 | Al metallizations | 50 | Black on transparent |

In another example, the following steps describe a process flow for an accelerometer:

Step 1 Deposit (spin) approximately 40 μm of polyimide on top of a silicon or silicon-based substrate (does not need to be prime quality). This forms the base of the flexible substrate. Repeated steps of spin-casting and curing are typically required.

Step 2 Deposit approximately 0.5 μm of $Si_3N_4$ on top of the polyimide.

Step 3 Deposit approximately 1 μm of Al 2 on top of the silicon nitride to give metallic connections to the accelerometer.

Step 4 Pattern the Al 2 using a mask (see P3.1 below) to form the Al contacts.

Step 5 Deposit (spin) approximately 7.5 μm of polyimide 2 to form a sacrificial layer on top of the patterned Al.

Step 6 Pattern the polyimide 2 layer using a mask (see P3.2 below) to form the anchors.

Step 7 Deposit approximately 12 μm of polysilicon 1 on top of the patterned sacrificial layer.

Step 8 Pattern the polysilicon 1 using a mask (see P3.3 below) to form the accelerometer.

Step 9 Underetch the polyimide layers (sacrificial layers).

|  | Material to be patterned | Minimum Feature Size (μm) | Polarity assuming (+) resist and etch |
|---|---|---|---|
| P3.1 | Al metallizations-2 | ≥20 | Black on transparent |
| P3.2 | Polyimide sacrificial layer | ≥20 | Black on transparent |
| P3.3 | Poly-Si accelerometer | 3 | Black on transparent |

In another example, the following steps describe a process flow for an accelerometer with encapsulation:

Step 1 Deposit (spin) approximately 40 pm of polyimide on top of a silicon or silicon-based substrate (does not need to be prime quality). This forms the base of the flexible substrate. Repeated steps of spin-casting and curing are typically required.

Step 2 Deposit approximately 0.5 μm of $Si_3N_4$ on top of the polyimide.

Step 3 Deposit approximately 1 μm of Al 2 on top of the silicon nitride to give metallic connections to the accelerometer.

Step 4 Pattern the Al 2 using a mask (see P3.1 below) to form the Al contacts.

Step 5 Deposit (spin) approximately 7.5 μm of polyimide 2 to form a sacrificial layer on top of the patterned Al.

Step 6 Pattern the polyimide 2 layer using a mask (see P3.2 below) to form the anchors.

Step 7 Deposit approximately 12 μm of polysilicon 1 on top of the patterned sacrificial layer.

Step 8 Pattern the polysilicon 1 using a mask (see P3.3 below) to form the accelerometer.

Step 9 Deposit approximately 10 μm of polyimide to form a second sacrificial layer.

Step 10 Pattern the polyimide (second sacrificial layer) with a mask (see P4.4 below).

Step 11 Deposit an encapsulant material on top of the sacrificial layer.

Step 12 Pattern the encapsulant material using a mask (see P4.5 below).

Step 13 Underetch the polyimide layers (sacrificial layers).

|  | Material to be patterned | Minimum Feature Size (μm) | Polarity assuming (+) resist and etch |
|---|---|---|---|
| P3.1 | Al metallizations-2 | ≥20 | Black on transparent |
| P3.2 | Polyimide sacrificial layer | ≥20 | Black on transparent |
| P3.3 | Poly-Si accelerometer | 3 | Black on transparent |
| P4.4 | Polyimide sacrificial layer | ≥100 | Black on transparent |
| P4.5 | Holes in encapsulation | ≥20 | Transparent on black |

The inventors have unexpectedly found a preferred method of depositing the Al layer by annealing the layered substrate at about 400 degrees Centigrade. Annealing provides a grain formation of aluminum at the bottom with amorphous silicon above, after which, by under etching, the aluminum is removed.

Piezoresistive sensors are preferred due to their high stability, high sensitivity, easy of fabrication and operate as well as for being more reliable and robust. Sensors are designed to provide a balance between strength and durability as well as sensitivity and repeatability. Suitable piezoresistive materials may include polysilicon. When using polysilicon, it has been found that laser ablated polysilicon piezo-resistors is a preferred material because it is crystalline during deposition, does not affect a polyimide material, when used, and provides improved properties to a final fabricated device as compared with low-pressure chemical vapor deposition polysilicon or as-grown polysilicon. The sensors include a central shuttle plate suspended over an undercut etched pit supported by bridge arms. Silicon nitride is a preferred material for forming a shuttle plate of the sensor because of its high strength as compared with bulk silicon.

FIGS. 8A-8F depict a layout and 3D modeling in Conventorware and half-symmetrical structure in ANSYS of various sensor designs in accordance with the present invention. Pressures in a range from 0 to more than 50 KPa were applied on a central shuttle plate to initiate deformation and axial compression or elongation on individual bridge arms. Each bridge arms includes piezoresistors connected in a Wheatstone's half bridge configuration. Such embodiments behave similar to a strain gauge, in which a normalized change in resistance of a piezo-resistor ($\Delta R/R$) is given by:

$$\Delta R/R = \text{average strain} \times \text{gauge factor} \quad (1)$$

And, a differential output voltage of a Wheatstone bridge ($\Delta Vout$) due to an applied pressure is given by:

$$\Delta Vout = \Delta R/R \times Vbias \quad (2)$$

Figure 8A:
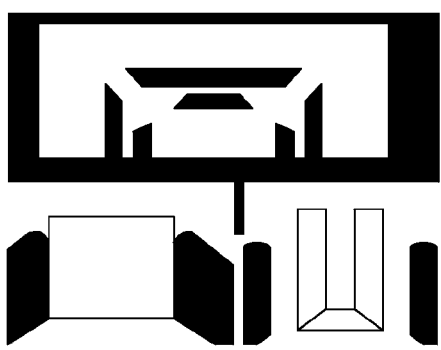
FIGS. 8A-8F depict a layout and 3D modeling in Conventorware and half-symmetrical structure in ANSYS of various sensor designs in accordance with the present invention.

The test results for the various designs are shown below:

| Layout | Dimensions | Displacement (micron) | [$\Delta R/R$] % | $\Delta Vout$ (mV) |
|---|---|---|---|---|
| FIG. 8A | $L_S = W_S = 50$ μm | 0.464 | 1.47 | 7.33 |
|  | $L_{PA} = W_{PA} = 21.21$ μm | 0.504 | 1.52 | 7.59 |
|  | $L_{TA} = W_{TA} = 21.21$ μm |  |  |  |
|  | $L_B = W_B = 40$ μm |  |  |  |

Figure 8B:
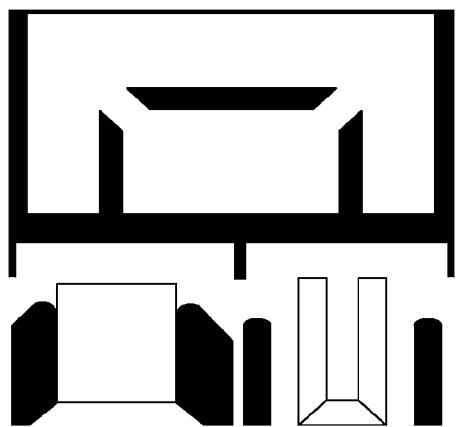
Figure 8C:
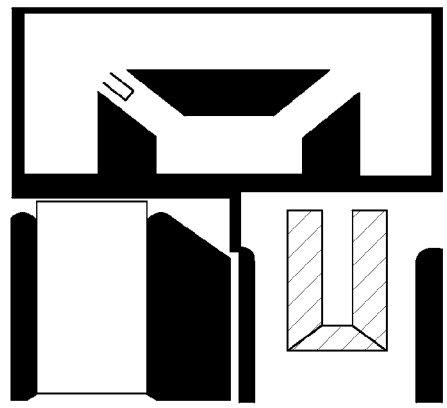
Figure 8D:
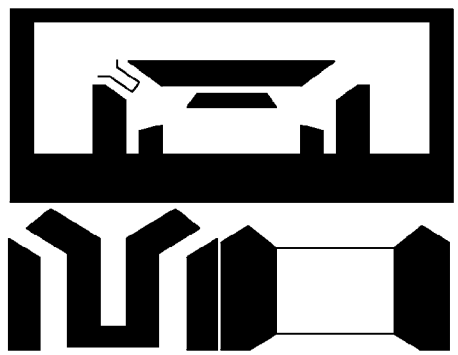
Figure 8E:
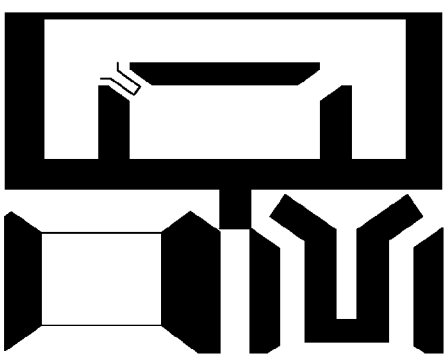
Figure 8F:
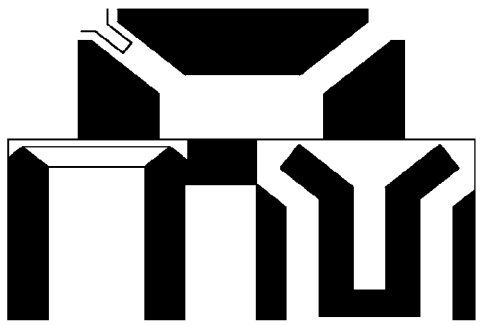

| Layout | Dimensions | Displacement (micron) | [ΔR/R] % | ΔVout (mV) |
|---|---|---|---|---|
| FIG. 8B | $L_S = W_S = 80$ μm | 0.453 | 1.45 | 7.22 |
|  | $L_{PA} A = W_{PA} = 21.21$ μm | 0.494 | 1.47 | 7.30 |
|  | $L_{TA} = W_{TA} = 21.21$ μm |  |  |  |
|  | $L_B = W_B = 50$ μm |  |  |  |
| FIG. 8C | $L_S = W_S = 50$ μm | 0.440 | 1.424 | 7.07 |
|  | $L_{PA} = L_{TA} = 54.83$ μm | 0.481 | 1.44 | 7.17 |
|  | $W_{PA} = W_{TA} = 21.21$ μm |  |  |  |
|  | $L_B = W_B = 40$ μm |  |  |  |
| FIG. 8D | $L_S = W_S = 50$ μm | 0.402 | 1.12 | 5.59 |
|  | $L_{PA} = W_{PA} = 14.14$ μm | 0.443 | 1.19 | 5.92 |
|  | $L_{TA} = W_{TA} = 14.14$ μm |  |  |  |
|  | $L_B = W_B = 40$ μm |  |  |  |
| FIG. 8E | $L_S = W_S = 80$ μm | 0.396 | 0.901 | 4.48 |
|  | $L_{PA} = W_{PA} = 14.14$ μm | 0.436 | 1.07 | 5.32 |
|  | $L_{TA} = W_{TA} = 14.14$ μm |  |  |  |
|  | $L_B = W_B = 50$ μm |  |  |  |
| FIG. 8F | $L_S = W_S = 50$ μm | 0.347 | 0.831 | 4.14 |
|  | $L_{PA} = L_{TA} = 35.55$ μm | 0.388 | 0.996 | 4.95 |
|  | $W_{PA} = W_{TA} = 14.14$ μm |  |  |  |
|  | $L_B = W_B = 40$ μm |  |  |  |

$L_S \times W_S$ is shuttle plate;
$L_{PA} \times W_{PA}$ is Bridge arm housing piezoresistor;
$L_B \times W_B$ is bolometer.

Figure 9:
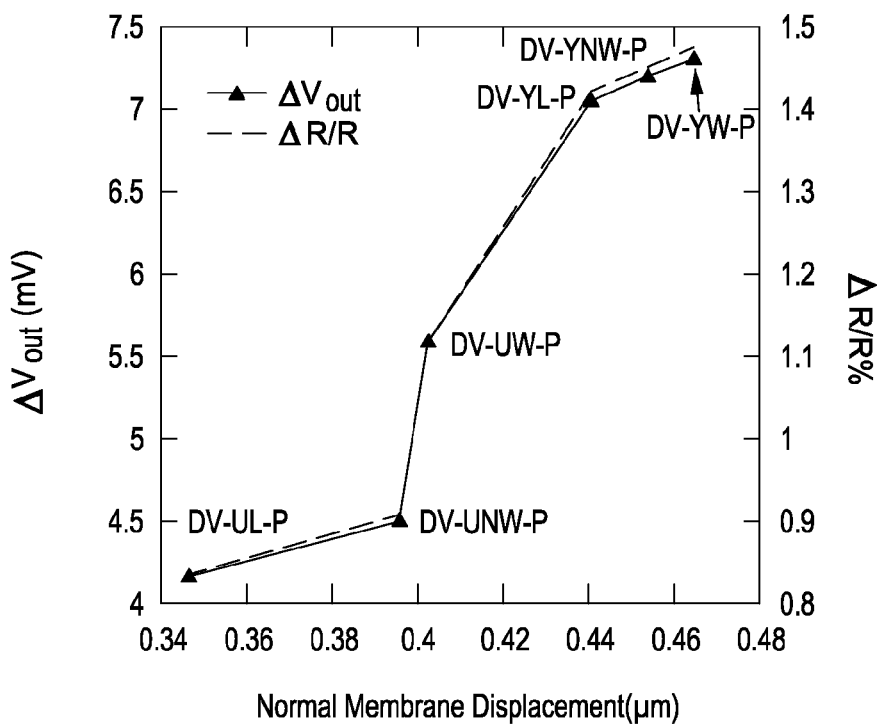
FIG. 9 is a graph showing test results of the various sensor designs of FIGS. 8A-8F in accordance with the present invention.
Figure 10:
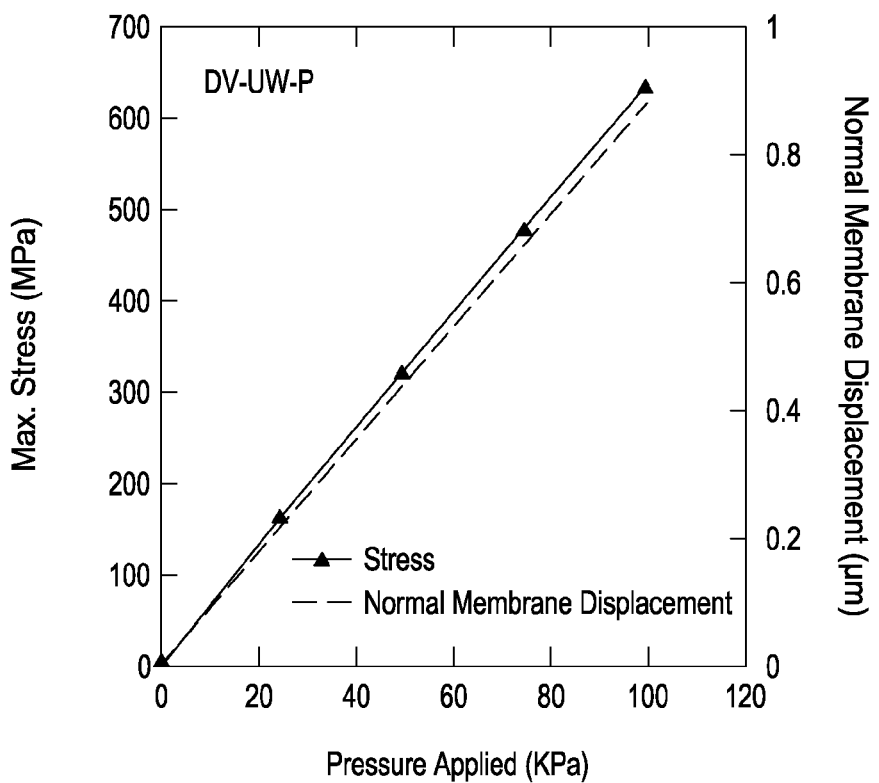
FIG. 10 is a graph showing test results of the sensor design of FIG. 8A in accordance with the present invention.

FIG. 9 is a graph showing test results of the various sensor designs of FIGS. 8A-8F in accordance with the present invention. FIG. 10 is a graph showing test results of the sensor design of FIG. 8A in accordance with the present invention.

Additional designs are shown below:

| Layout | Dimensions | Displacement (micron) | [ΔR/R] % | ΔVout (mV) |
|---|---|---|---|---|
| G | $L_S = W_S = 80$ μm | 0.28 | 0.277 | 1.38 |
|  | $L_{PA} = 20$ μm; $W_{PA} = 10$ μm |  |  |  |
|  | $L_{TA} = 16$ μm; $W_{TA} = 10$ μm |  |  |  |
| H | $L_S = W_S = 80$ μm | 0.3 | 0.307 | 1.53 |
|  | $L_{PA} = 20$ μm; $W_{PA} = 10$ μm |  |  |  |
|  | $L_{TA} = 16$ μm; $W_{TA} A = 14.14$ μm |  |  |  |
| I | $L_S = W_S = 70$ μm | 0.35 | 0.314 | 1.57 |
|  | $L_{PA} = 16$ μm; $W_{PA} = 15$ μm |  |  |  |
|  | $L_{TA} = 43$ μm; $W_{TA} = 16$ μm |  |  |  |
| J | $L_S = W_S = 80$ μm | 0.42 | 0.482 | 2.41 |
|  | $L_{PA} = 16$ μm; $W_{PA} = 15$ μm |  |  |  |
|  | $L_{TA} = 43$ μm; $W_{TA} = 16$ μm |  |  |  |
| K | $L_S = W_S = 70$ μm | 0.8 | 0.829 | 4.13 |
|  | $L_{PA} = 38$ μm; $W_{PA} = 16$ μm |  |  |  |
|  | $L_{TA} = 38$ μm; $W_{TA} = 16$ μm |  |  |  |
| L | $L_S = W_S = 80$ μm | 0.93 | 0.929 | 4.63 |
|  | $L_{PA} = 38$ μm; $W_{PA} = 16$ μm |  |  |  |
|  | $L_{TA} = 38$ μm; $W_{TA} = 16$ μm |  |  |  |

$L_S \times W_S$ is shuttle plate;
$L_{PA} \times W_{PA}$ is Bridge arm housing piezo-resistor;
$L_B \times W_B$ is bolometer.

Examples of response of sensor designs to pressures imparted to an event such as CPR are shown below:

| | Type of sensor | Displacement (micron) | Average strain | [ΔR/R] % | ΔVout (in mV) |
|---|---|---|---|---|---|
| FIG. 8A | Y-Piezoresistor (with inner windows) | 0.4641 | 0.000291 | 1.4784 | 7.33 |
| FIG. 8B | Y-Piezoresistor (no inner windows) | 0.4533 | 0.0002849 | 1.455 | 7.22 |
| FIG. 8C | Y-Piezoresistor (Long-arm; no inner windows) | 0.4401 | 0.0002625 | 1.4245 | 7.07 |
| FIG. 8D | U-Piezoresistor (with inner windows) | 0.4024 | 0.0002253 | 1.1268 | 5.59 |
| FIG. 8E | U-Piezoresistor (no inner windows) | 0.3960 | 0.0001803 | 0.9017 | 4.48 |
| FIG. 8F | U-Piezoresistor (Long-arm; no inner windows) | 0.3475 | 0.000166 | 0.8318 | 4.14 |

REFERENCES

1. "Uncooled Infrared Microbolometers on a Flexible Substrate," A. Yaradanakul, D. P. Butler, and Z. Celik-Butler, IEEE Transactions on Electron Devices, vol. 49, pp. 930-933, 2002.
2. "Microbolometers on a Flexible Substrate for Infrared Detection," A. Yildiz, Z. Celik-Butler, D. P. Butler, IEEE Sensors Journal, vol. 4, pp. 112-117 (2004).
3. "Flexible Microbolometers Promise Smart Fabrics with Imbedded Sensors," A. Mahmood, D. P. Butler and Z. Celik-Butler, Laser Focus World, pp. 99-103 (April 2004).
4. "Micromachined Infrared Bolometers on Flexible Polyimide Substrates," S. A. Dayeh, D. P. Butler and Z. Celik-Butler, Sensors and Actuators vol. A118, pp. 49-56 (2005).
5. "Micromachined Integrated Pressure-Thermal Sensors on Flexible Substrates," V. Shamanna, S. Das, Z. Celik-Butler, D. P. Butler, and K. L. Lawrence, Journal of Micromechanics and Microengineering vol. 16, 1984-1992 (2006).
6. "Micromachined Bolometers on Polyimide," A. Mahmood, Z. Celik-Butler, and D. Butler, "Sensors and Actuators A, vol. 132, pp. 452-459 (2006).
7. "Flexible Sensors: a Review," Z. Celik-Butler and D. P. Butler, J. Nanoelectronics and Optoelectronics, vol. 1, pp. 194-202 (2006).
8. "Smart Skin," Mid-Cities Technical Club Meeting, Arlington, Tex. (Mar. 3, 2004).
9. "Smart Skin. Multifunctional Sensory Arrays on Flexible Substrates," Strategic Partnership for Research in Nanotechnology (SPRING) Workshop 11, University of Texas at Dallas, (Nov. 12, 2004).
10. "Smart Skin. Multisensory Arrays on Flexible Substrates," Freescale Semiconductor Co., Tempe, Ariz. (Jan. 13, 2006).
11. "Self Packaged Flexible Electronics, IEEE-EDIS Distinguished Lecture, Tempe Ariz. (Jan. 13, 2006).
12. "Nano-Bio Interface," BIODFW Regional Alliance, Southwestern Medical Center, Dallas, Tex. (Apr. 20, 2006).
13. "Self-Packaged Flexible Electronics," NanoTX, Dallas Convention Center, Dallas Tex. (Sep. 28, 2006).

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware including a purely analog circuit, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

The invention claimed is:

1. A sensor (100, 300, 400) comprising:
    a thin and substantially flat flexible substrate (102, 406);
    one or more sensor arrays (104, 302) fabricated on the flexible substrate (102, 406) that measure acceleration, force or pressure, wherein each sensor array includes at least a pressure sensor comprising a bridge structure having a central plate suspended over a pit by at least two bridge arms and one or more piezoresistors disposed on at least one of the bridge arms;
    an output interface (108, 418) disposed on the flexible substrate (102, 406);
    a processor or an analog circuit (304) disposed on the flexible substrate (102, 406) and connected to the one or more sensor arrays (104, 302) and the output interface (108, 418);
    a power source (106, 416) disposed on the flexible substrate (102, 406) and connected to the one or more sensor arrays (104, 302), the output interface (108, 418), and the processor or the analog circuit (304); and
    the flexible substrate (102, 406), the one or more sensor arrays (104, 302), the output interface (108, 418), the processor or an analog circuit (304) and the power source (106, 416) form a flexible integrated circuit that can be stretched, wrinkled or flexed without degradation of the flexible integrated circuit.

2. The sensor (100, 300, 400) as recited in claim 1, wherein:
    the flexible substrate (102, 406) comprises a polymer or a metal film; and
    the one or more sensor arrays (104, 302) measure depth, force, frequency or acceleration of compressions.

3. The sensor (100, 300, 400) as recited in claim 1, further comprising a protective layer covering the sensor array(s) (104, 302), the processor or the analog circuit (304), and the output interface (108, 418).

4. The sensor (100, 300, 400) as recited in claim 1, wherein the sensor array(s) (104, 302) comprise:
    one or more accelerometers (200); and
    one or more pressure sensors (202) positioned around the accelerometer(s) (200).

5. The sensor (100, 300, 400) as recited in claim 1, wherein:
    the processor or the analog circuit (304) determines whether one or more operational parameters are within one or more guidelines and provides a feedback regarding whether the operational parameters are within the guidelines via the output interface (108, 418); and
    the one or more operational parameters comprise an applied pressure, an acceleration, a shearing force, a compressive force or a combination thereof.

6. The sensor (100, 300, 400) as recited in claim 5, further comprising a data storage (310) connected to the processor or the analog circuit (304) that stores the one or more parameters, the feedback, a status of the sensor, diagnostic information or a combination thereof.

7. The sensor (100, 300, 400) as recited in claim 6, wherein the data storage (310) comprises a RFID tag, a magnetic strip, a memory or a combination thereof.

8. The sensor (100, 300, 400) as recited in claim 1, wherein the substrate (102, 406) is rigid or semi-flexible instead of flexible.

9. The sensor (100, 300, 400) as recited in claim 1, wherein the sensor array(s) (104, 302) further measure one or more operational parameters.

10. The sensor (100, 300, 400) as recited in claim 9, wherein the one or more operational parameters comprise a physical contact with an object or a recipient, a temperature of the object or the recipient, an electrical activity of the object or the recipient, or a combination thereof.

11. The sensor (100, 300, 400) as recited in claim 10, wherein:
the recipient is a human or an animal; and
the object is a machine, a structure, a composition, a vehicle, a plant or a natural object.

12. The sensor (100, 300, 400) as recited in claim 1, wherein the output interface (108, 418) comprises a visual display, a speaker, a multi-tone generator, a communications interface (306) or a combination thereof.

13. The sensor (100, 300, 400) as recited in claim 12, wherein the visual display comprises a set of light emitting diodes, a liquid crystal display or combination thereof that provide a feedback to a user.

14. The sensor (100, 300, 400) as recited in claim 12, wherein the communications interface (306) comprises an optical communications interface, an infrared communications interface, a wireless communications transceiver, a physical communications port or a combination thereof.

15. The sensor (100, 300, 400) as recited in claim 14, wherein the wireless transceiver comprises an active radio frequency identification tag, a passive radio frequency identification tag, a cellular phone, an Internet connection or a personal data assistant.

16. The sensor (100, 300, 400) as recited in claim 1, further comprising:
a geographic locator (208) that is disposed on the flexible substrate (102, 406) and connected to the processor or the analog circuit (304); and
a communications interface (306) disposed on the flexible substrate (102, 406), connected to the processor or the analog circuit (304), wherein the processor or the analog circuit (304) periodically transmits a status of the sensor, a location of the sensor as determined by the geographic locator (208), diagnostic information, a status of the recipient or object, or a combination thereof to another location via the communications interface (306).

17. The sensor (100, 300, 400) as recited in claim 1, wherein the sensor (100, 300, 400) is integrated in or attached to a recipient, an object, a device, a personal item, a clothing or a thin portable user device.

18. The sensor (100, 300, 400) as recited in claim 17, wherein the device comprises a phone, a mobile communications device, a cellular phone, an audio and/or video device or a personal data assistant.

19. The sensor (100, 300, 400) as recited in claim 1, wherein the power source (106, 416) comprises a battery, a solar panel, a layer of piezoelectric film (408) for voltage generation, an electromagnetic voltage generator, an energy harvesting device or a combination thereof.

20. The sensor (100, 300, 400) as recited in claim 19, wherein the battery is replaceable or rechargeable.

21. The sensor (100, 300, 400) as recited in claim 1, wherein the power source (106, 416) comprises:
a battery;
layer of piezoelectric film (408) or other energy harvesting methods for voltage generation; and
a power controller to manage power consumption and storage in the battery and the layer of piezoelectric film.

22. The sensor (100, 300, 400) as recited in claim 1, further comprising a magnetic strip, a RFID tag, a wireless communications device or other information bearing device disposed on the exterior or interior of the sensor.

23. A sensor (100, 300, 400) comprising:
an upper protective layer (402);
a lower protective layer (404); and
a thin and substantially flat flexible polymer or thin metal substrate (102, 406) disposed between the upper protective layer (402) and the lower protective layer (404);
one or more sensor arrays (104, 302) fabricated on the substrate that measure acceleration, force or pressure, wherein each sensor array includes at least a pressure sensor comprising a bridge structure having a central plate suspended over a pit by at least two bridge arms and one or more piezoresistors disposed on at least one of the bridge arms;
an output interface (108, 418) disposed on the substrate (102, 406);
a processor or an analog circuit (304) disposed on the substrate (102, 406) and connected to the sensor array(s) (104, 302) and the output interface (108, 418);
a power source (106, 416) disposed on the substrate (102, 406) and connected to the processor or the analog circuit (304); and
the upper protective layer (402), the lower protective layer (404), the flexible substrate (102, 406), the one or more sensor arrays (104, 302), the output interface (108, 418), the processor or an analog circuit (304) and the power source (106, 416) form a flexible integrated circuit that can be stretched, wrinkled or flexed without degradation of the flexible integrated circuit.

24. The sensor (100, 300, 400) as recited in claim 23, wherein the upper protective layer (402) and the lower protective layer (404) encapsulate the substrate (102, 406).

25. The sensor (100, 300, 400) as recited in claim 23, further comprising an energy producing layer (408) disposed between the lower protective layer (404) and the substrate (102, 406).

26. The sensor (100, 300, 400) as recited in claim 23, wherein the sensor array(s) (104, 302) comprise:
one or more accelerometers (200) ; and
one or more pressure sensors (202) positioned around the accelerometer(s) (200).

27. The sensor (100, 300, 400) as recited in claim 23, wherein:
the processor or the analog circuit (304) determines whether one or more operational parameters are within one or more guidelines and provides a feedback regarding whether the operational parameters are within the guidelines via the output interface (108, 418); and
the one or more operational parameters comprise an applied pressure, an acceleration, a shearing force, a compressive force or a combination thereof.

28. The sensor (100, 300, 400) as recited in claim 23, wherein the substrate (102, 406) is rigid or semi-flexible instead of flexible.

29. The sensor (100, 300, 400) as recited in claim 23, wherein the output interface (108, 418) comprises a visual display, a speaker, a multi-tone generator, a communications interface or a combination thereof.

30. The sensor (100, 300, 400) as recited in claim 24, further comprising:
a geographic locator (208) that is disposed on the flexible substrate (102, 406) and connected to the processor or the analog circuit (304); and a communications interface (306) disposed on the flexible substrate (102, 406), connected to the processor or the analog circuit (304), wherein the processor or the analog circuit (304) periodically transmits a status of the sensor, a location of the sensor as determined by the geographic locator (208), diagnostic information, a status of a recipient or object, or a combination thereof to another location via the communications interface (306).

31. The sensor (100, 300, 400) as recited in claim 23, wherein the power source (106, 416) comprises a battery, a solar panel, a layer of piezoelectric film (408) for voltage generation, an electromagnetic voltage generator, an energy harvesting device or a combination thereof.

32. A method or manufacturing a sensor comprising the steps of:
passivating a silicon wafer;
adding a polyimide layer to the wafer;
creating one or more sensor arrays (104, 302) on the polyimide layer using a Micro-Electro-Mechanical Systems (MEMS) process wherein the sensor array(s) (104, 302) measure acceleration, force or pressure, wherein each sensor array includes at least a pressure sensor comprising a bridge structure having a central plate suspended over a pit by at least two bridge arms and one or more piezoresistors disposed on at least one of the bridge arms;
dicing the wafer to extract the individual dies/sensors;
printing a circuit on a flexible substrate (102, 406);
applying a paste or epoxy to the flexible substrate (102, 406) to receive and secure the individual dies/sensors;
placing the individual dies/sensors on the flexible substrate (102, 406);
placing the flexible substrate (102, 406) on a lower protective layer (404) containing electrical interconnects and an output interface (108, 418) a processor or an analog circuit (304), and a power source (106, 416);
securing the flexible substrate (102, 406) to the lower protective layer (404);
placing and securing a upper protective layer (402) to the flexible substrate (102, 406) and the lower protective layer (404) to complete assembly of the sensor; and
wherein the foregoing steps form a flexible integrated circuit that can be stretched, wrinkled or flexed without degradation of the flexible integrated circuit.

33. The method as recited in claim 32, further comprising the step of testing the sensor (100, 300, 400).

34. The method as recited in claim 32, wherein the one or more sensor arrays (104, 302) comprises a pressure sensor and the step of creating the one or more sensor arrays (104, 302) on the polyimide layer comprises the steps of:
depositing a layer of $Si_3N_4$ on top of the polyimide layer;
patterning the layer of $Si_3N_4$ using a mask to from the bridge structure;
depositing a polysilicon layer on top of the layer of $Si_3N_4$;
patterning the polysilicon layer using a mask to form the one or more piezoresistors;
depositing a metallic layer on top of the polysilicon layer; and
patterning the metallic layer to form conductive leads for the pressure sensor.

35. The method as recited in claim 32, wherein the polyimide layer comprises a first polyimide layer, and the step of creating the one or more sensor arrays (104, 302) on the first polyimide layer comprises the steps of:
depositing a first layer of $Si_3N_4$ on top of the first polyimide layer;
depositing a second layer of polyimide on the layer $Si_3N_4$;
depositing a second layer of $Si_3N_4$ on top of the second polyimide layer;
patterning the second layer of $Si_3N_4$ using a mask to from the bridge structure;
depositing a polysilicon layer on top of the layer of $Si_3N_4$;
patterning the polysilicon layer using a mask to form the one or more piezoresistors;
depositing a metallic layer on top of the polysilicon layer;
patterning the metallic layer to form conductive leads for the pressure sensor; and
underetching the second polyimide layer.

36. The method as recited in claim 32, wherein the one or more sensor arrays (104, 302) further includes an accelerometer, the polyimide layer comprises a first polyimide layer, and the step of creating the one or more sensor arrays (104, 302) on the first polyimide layer comprises the steps of:
depositing a first layer of $Si_3N_4$ on top of the first polyimide layer;
depositing a metallic layer on top of the first layer of $Si_3N_4$;
patterning the metallic layer to form conductive leads for the accelerometer;
depositing a second layer of polyimide on the patterned metallic layer;
patterning the second layer of polyimide using a first mask to from one or more anchors;
depositing a second layer of $Si_3N_4$ on top of the second polyimide layer;
patterning the second layer of $Si_3N_4$ using a second mask to form the accelerometer; and
underetching the second polyimide layer.

37. The method as recited in claim 32, further comprising wherein the one or more sensor arrays (104, 302) further includes an accelerometer, the polyimide layer comprises a first polyimide layer, and the step of creating the one or more sensor arrays (104, 302) on the first polyimide layer comprises the steps of:
depositing a first layer of $Si_3N_4$ on top of the first polyimide layer;
depositing a metallic layer on top of the first layer of $Si_3N_4$;
patterning the metallic layer to form conductive leads for the accelerometer;
depositing a second layer of polyimide on the patterned metallic layer;
patterning the second layer of polyimide using a first mask to from one or more anchors;
depositing a second layer of $Si_3N_4$ on top of the second polyimide layer;
patterning the second layer of $Si_3N_4$ using a second mask to form the accelerometer;
depositing a third layer of polyimide on the patterned second layer of $Si_3N_4$;
patterning the third layer of polyimide using a third mask;
depositing an encapsulant material on the patterned third layer of polyimide;
patterning the encapsulant material using a fourth mask; and
underetching the second polyimide layer and the third polyimide layer.

38. The sensor as recited in claim 1, wherein the sensor has a thickness less than or equal to 1.25 mm.

39. The sensor as recited in claim 23, wherein the sensor has a thickness less than or equal to 1.25 mm.

40. The method as recited in claim 32, wherein the sensor has a thickness less than or equal to 1.25 mm.

41. The sensor as recited in claim 1, wherein the central shuttle plate comprises $Si_3N_4$ and the pit comprises an undercut etched pit.

42. The sensor as recited in claim 23, wherein the central shuttle plate comprises $Si_3N_4$ and the pit comprises an undercut etched pit.

\* \* \* \* \*